United States Patent
Wu et al.

(10) Patent No.: US 10,928,580 B2
(45) Date of Patent: Feb. 23, 2021

(54) BACKLIGHT MODULE, DISPLAY DEVICE AND METHOD FOR ADJUSTING BRIGHTNESS OF BACKLIGHT MODULE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Shouzheng Wu, Beijing (CN); Tongmin Liu, Beijing (CN); Jun Xu, Beijing (CN); Qing Zhang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 15 days.

(21) Appl. No.: 16/331,396

(22) PCT Filed: May 24, 2018

(86) PCT No.: PCT/CN2018/088144
§ 371 (c)(1),
(2) Date: Mar. 7, 2019

(87) PCT Pub. No.: WO2019/033816
PCT Pub. Date: Feb. 21, 2019

(65) Prior Publication Data
US 2020/0183078 A1 Jun. 11, 2020

(30) Foreign Application Priority Data
Aug. 17, 2017 (CN) .......................... 2017 1 0706498

(51) Int. Cl.
*F21V 8/00* (2006.01)
*G02F 1/16757* (2019.01)
(Continued)

(52) U.S. Cl.
CPC ........... *G02B 6/0055* (2013.01); *G02F 1/167* (2013.01); *G02F 1/1676* (2019.01); *G02F 1/1677* (2019.01); *G02F 1/16757* (2019.01)

(58) Field of Classification Search
CPC ..... G02B 6/0055; G02F 1/1676; G02F 1/167; G02F 1/1675; G02F 1/1677; G02F 1/133615; G02F 1/16757; F21V 7/00
See application file for complete search history.

(56) References Cited

U.S. PATENT DOCUMENTS 7,852,430 B1    12/2010    Gettmey
8,498,041 B2 *   7/2013    Komatsu .................. G02F 1/167
                                                          359/296
(Continued)

FOREIGN PATENT DOCUMENTS

CN    101673525 A    3/2010
CN    102707536 A    10/2012
(Continued)

OTHER PUBLICATIONS

International Search Report and Written Opinion of the International Searching Authority (with English language translation of Written Opinion), International Application No. PCT/CN2018/088144, dated Sep. 11, 2018, 13 pp.
(Continued)

*Primary Examiner* — Peggy A Neils
(74) *Attorney, Agent, or Firm* — Myers Bigel, P.A.

(57) ABSTRACT

The present disclosure provides a backlight module, a display device and a method for adjusting brightness of the backlight module. The backlight module includes a light guide plate comprising a light emitting surface and a first surface opposite to the light emitting surface, and a reflective component on a side of the light guide plate away from the light emitting surface, the reflective component having a reflectivity adjustable to adjust a brightness of the backlight
(Continued)

module. In this way, the reflective component in the backlight module can be used to dynamically adjust the brightness of the backlight and improve the contrast between different regions of the backlight module, thereby realizing the display effect of the high dynamic range image. Moreover, the backlight module is low in cost, simple in preparation, and suitable for various types of display devices.

18 Claims, 3 Drawing Sheets

(51) Int. Cl.
*G02F 1/1676* (2019.01)
*G02F 1/1677* (2019.01)
*G02F 1/167* (2019.01)

(56) References Cited

U.S. PATENT DOCUMENTS

| | | | |
|---|---|---|---|
| 9,305,496 B2* | 4/2016 | Kimura | G09G 3/344 |
| 2009/0034295 A1* | 2/2009 | Song | G02B 6/0036 |
| | | | 362/620 |
| 2010/0060825 A1 | 3/2010 | Jang et al. | |
| 2012/0242565 A1 | 9/2012 | Noh et al. | |
| 2016/0349430 A1* | 12/2016 | Li | G02F 1/133514 |
| 2017/0153526 A1* | 6/2017 | Okabe | G02F 1/133514 |
| 2017/0269283 A1* | 9/2017 | Wang | G02B 6/0055 |
| 2017/0301273 A1* | 10/2017 | Atkinson | G09G 3/19 |
| 2018/0067373 A1* | 3/2018 | Kimura | G02F 1/167 |
| 2018/0149942 A1* | 5/2018 | Harris | G02F 1/167 |

FOREIGN PATENT DOCUMENTS

| | | |
|---|---|---|
| CN | 104834052 A | 8/2015 |
| CN | 107315283 A | 11/2017 |

OTHER PUBLICATIONS

First Office Action and English language translation, CN Application No. 201710706498.7, dated Apr. 4, 2019, 12 pp.

* cited by examiner

BACKLIGHT MODULE, DISPLAY DEVICE AND METHOD FOR ADJUSTING BRIGHTNESS OF BACKLIGHT MODULE

CROSS REFERENCE TO RELATED APPLICATIONS

The present application is a 35 U.S.C. 371 national stage application of PCT International Application No. PCT/CN2018/088144, filed on May 24, 2018, which claims the benefit of Chinese Patent Application No. 201710706498.7, filed on Aug. 17, 2017, the contents of which are incorporated herein by reference in their entireties. The above-referenced International Application was published in the Chinese language as International Publication No. WO 2019/033816 A1 on Feb. 21, 2019.

TECHNICAL FIELD

The present disclosure relates to the field of display technology, and particularly to a backlight module, a display device and a method for adjusting a brightness of the backlight module.

BACKGROUND

Compared to normal images, High dynamic range (HDR) images can provide more dynamic range and image detail, which improves the contrast of the images. Therefore, high dynamic range image technology has unparalleled advantages in the field of liquid crystal display. It can present more vivid colors, black is deeper, objects in the image are more clear, and the color gamut is also expanded. However, in order to realize the display effect of the high dynamic range image, the liquid crystal display also needs to be adjusted accordingly: in the liquid crystal display device that realizes the display effect of the high dynamic range image, the backlight brightness also needs to be dynamically adjusted by the backlight module to improve the contrast, thereby meeting the requirements of displaying high dynamic range images.

SUMMARY

In an aspect of the present disclosure, a backlight module is provided. The backlight module includes: a light guide plate including a light emitting surface and a first surface opposite to the light emitting surface; and a reflective component on a side of the light guide plate away from the light emitting surface; the reflective component having a reflectivity adjustable to adjust a brightness of the backlight module.

In some embodiments, the reflective component includes electronic ink.

In some embodiments, the reflective component includes: a first substrate and a second substrate opposite to each other, and electronic ink between the first substrate and the second substrate; the first substrate is closer to the light guide plate than the second substrate; the first substrate is provided with at least one first electrode, and the second substrate is provided with at least one second electrode; the at least one first electrode is in one-to-one correspondence with the at least one second electrode.

In some embodiments, the reflective component further includes: a reflective layer between the first substrate and the second substrate, and located on the second substrate.

In some embodiments, the reflective layer and the at least one second electrode are disposed on a same side of the second substrate; alternatively, the reflective layer and the at least one second electrode are respectively disposed on both sides of the second substrate.

In some embodiments, a material of the first electrode is a transparent conductive material; a material of the second electrode includes at least one of graphite, a metal, and a transparent conductive material.

In some embodiments, a material of at least one of the first substrate and the second substrate includes at least one of polyethylene terephthalate, glass, polyimide, and polymethyl methacrylate.

In some embodiments, the electronic ink includes a plurality of microcapsules; each microcapsule is encapsulated with first particles and second particles; the first particles and the second particles are oppositely charged; the first particles are black and the second particles are white.

In some embodiments, an orthographic projection of the at least one first electrode on the first substrate and an orthographic projection of a corresponding second electrode on the first substrate are substantially overlapping.

In some embodiments, each first electrode includes a plurality of first sub-electrodes, and the corresponding second electrode includes a plurality of second sub-electrodes; the first sub-electrodes are in one-to-one correspondence with the plurality of second sub-electrodes.

In some embodiments, the reflective component further includes: at least one retaining wall between the first substrate and the second substrate separating the electronic ink.

In some embodiments, the reflective component is divided into a plurality of display partitions, each of the plurality of display partitions being provided with one first electrode and one second electrode.

In another aspect of the present disclosure, a display device is provided. The display device includes the backlight module described in any one of the above-mentioned embodiments.

In yet another aspect of the present disclosure, a method for adjusting a brightness of a backlight module is provided. The backlight module includes: a light guide plate including a light emitting surface and a first surface opposite to the light emitting surface; and a reflective component on a side of the light guide plate away from the light emitting surface; the reflective component having a reflectivity adjustable to adjust the brightness of the backlight module. The method includes: adjusting the reflectivity of the reflective component to adjust the brightness of the backlight module.

In some embodiments, the reflective component includes: a first substrate and a second substrate opposite to each other, and electronic ink between the first substrate and the second substrate; the first substrate is closer to the light guide plate than the second substrate; the first substrate is provided with at least one first electrode, and the second substrate is provided with at least one second electrode; the at least one first electrode is in one-to-one correspondence with the at least one second electrode. The step of adjusting the reflectivity of the reflective component to adjust the brightness of the backlight module includes: applying opposite voltages to the first electrode and the corresponding second electrode respectively, thereby adjusting the reflectivity of the backlight module using the electronic ink.

In some embodiments, the method further includes: separately controlling an electric field between each first electrode and a corresponding second electrode.

In some embodiments, the step of separately controlling an electric field between each first electrode and a corresponding second electrode includes: separately controlling an electric field direction and/or electric field strength between each first electrode and the corresponding second electrode.

BRIEF DESCRIPTION OF THE DRAWINGS

The above and/or additional aspects and advantages of the present disclosure will become clear and readily understood from the description of the embodiments in conjunction with the following drawings.

DETAILED DESCRIPTION OF THE DISCLOSURE

Figure 1:
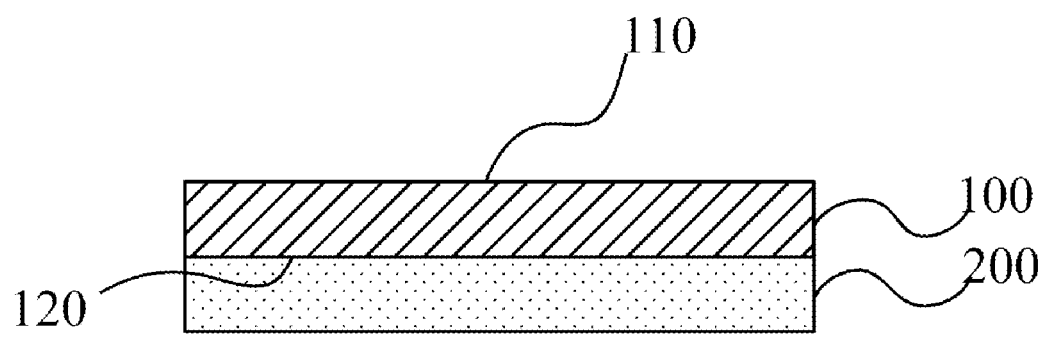
FIG. 1 is a structural schematic diagram of a backlight module according to at least one embodiment of the present disclosure.

The embodiments of the present disclosure are described in detail below, and the examples of the embodiments are illustrated in the drawings, wherein the same or similar reference signs are used to refer to the same or similar elements or elements having the same or similar functions. The embodiments described below with reference to the accompanying drawings are intended to be illustrative only, and are not to be construed as limiting the present disclosure.

The inventors have found that current backlight modules and display devices generally have problems such as immutable brightness of backlight module, low contrast, excessive thickness, poor service life, high cost, complicated preparation methods, and the like, and they cannot realize the display effect of the high dynamic range image. The inventors have conducted in-depth research and a large number of experiments and found that this is mainly because the backlight brightness of the conventional display cannot be dynamically adjusted by the backlight module. The brightness at different positions of the backlight module is uniform, and only the gray scale is used to display multiple brightnesses. Therefore, the contrast is not high, and it is difficult to meet the requirement on the contrast in the HDR display.

The present disclosure provides a backlight module. According to at least one embodiment of the disclosure, referring to FIG. 1, the backlight module includes: a light guide plate 100 including a light emitting surface 110 and a first surface 120 opposite to the light emitting surface 110. A reflective component 200 is disposed on a side of the light guide plate 100 away from the light emitting surface 110. The reflective component 200 has an adjustable reflectivity, thereby adjusting a brightness of the backlight module. In this way, the reflective component 200 in the backlight module can be used to dynamically adjust the brightness of the backlight and improve the contrast between multiple regions of the backlight module, thereby realizing the display effect of the high dynamic range image. Moreover, the backlight module is low in cost, simple in preparation, and suitable for various types of display devices.

According to at least one embodiment of the present disclosure, the reflective component 200 includes electronic ink. In this way, the backlight brightness can be dynamically adjusted by using the electronic ink in the reflective component 200, and the contrast between multiple regions of the backlight module can be improved, thereby realizing the display effect of the high dynamic range image.

The inventors have unexpectedly discovered that the above backlight module manufactured by the electronic ink technology can be used in a display device. Since the display effect of the high dynamic range image is realized by modifying the backlight module, the display effect of the high dynamic range image can be realized in the full-size display device, and is not subject to the arrangement and control mode of the LED. The structure, circuit and IC control of the display device do not need to be changed. That is to say, the display device manufactured by using the electronic ink only needs to manufacture the backlight module by using the electronic ink technology. Only the backlight module is modified, and other structures of the display device (for example, a driving circuit) need not to be modified. Some designs are the fastest to achieve high dynamic range image display. The original design can be retained to the maximum extent, and the display effect of high dynamic range images can be realized in the easiest way. Moreover, the display device is lighter and thinner, the light transmittance is not affected, and there is no light consumption in the optical path. Furthermore, by applying the backlight module according to the embodiments of the present disclosure, it is possible to avoid adding an array of LEDs into the backlight module, or adding a design of a liquid crystal cell for adjusting brightness, thereby realizing HDR display without significantly increasing the thickness of the backlight module. In summary, the display device manufactured by using the backlight module is lighter and thinner, can dynamically adjust the backlight brightness, improve the contrast between multiple regions of the backlight module, and the display effect of the high dynamic range image is thus realized.

Figure 2:
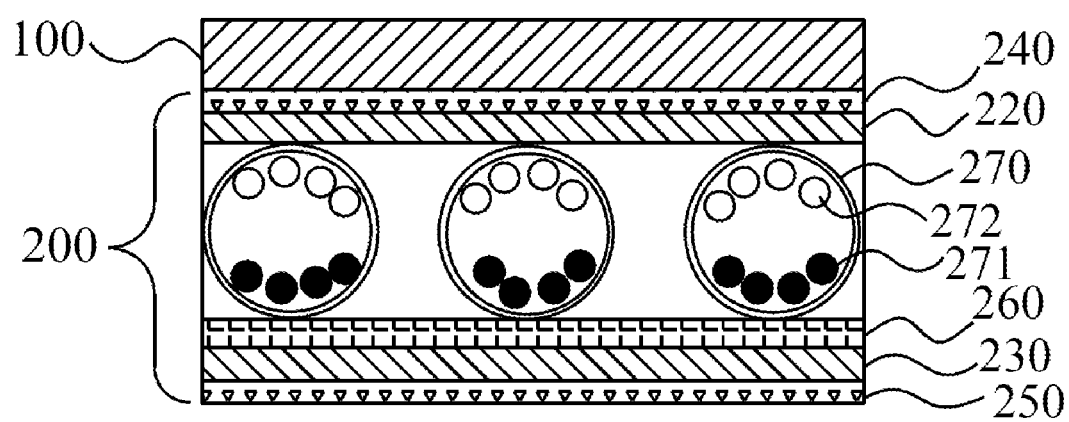
FIG. 2 is a structural schematic diagram of a reflective component according to at least one embodiment of the present disclosure.

In some embodiments of the present disclosure, referring to FIG. 2, the reflective component 200 includes: a first substrate 220 and a second substrate 230 disposed opposite to each other, and electronic ink between the first substrate 220 and the second substrate 230. The first substrate 220 is closer to the light guide plate 100 than the second substrate 230; the first substrate 220 is provided with at least one first electrode 240, and the second substrate 230 is provided with at least one second electrode 250; the at least one first electrode 240 is in one-to-one correspondence with the at least one second electrode 250.

In some embodiments, the electronic ink includes a plurality of microcapsules 270; each microcapsule 270 is encapsulated with first particles 271 and second particles 272; the first particles 271 and the second particles 272 are oppositely charged; the first particles 271 are black and the second particles 272 are white. According to the embodiments of the present disclosure, the first substrate 220 is provided with the first electrode 240, and the second substrate 230 is provided with the second electrode 250, and the first electrode 240 and the second electrode 250 are correspondingly disposed. Therefore, the display of the electronic ink can be controlled by the first electrode 240 and the second electrode 250. In this way, the display effect of the display device using the backlight module can be further improved. It should be noted that the above-mentioned "first substrate" and "second substrate" are for the purpose of description only, and are used to distinguish two substrates above and below the electronic ink, and are not to be understood as indicating or suggesting relative importance or position limitation.

According to the embodiments of the present disclosure, the arrangement position of the first electrode 240 is not particularly limited. The first electrode 240 may be disposed on a side of the first substrate 220 away from the microcapsules 270, or may be disposed on a side of the first substrate 220 close to the microcapsules 270. According to the embodiment of the present disclosure, the arrangement position of the second electrode 250 is not particularly limited. The second electrode 250 may be disposed on a side of the second substrate 230 away from the microcapsules 270, or may be disposed on a side of the second substrate 230 close to the microcapsules 270. For example, according to at least one embodiment of the present disclosure, referring to FIG. 2, the first substrate 220 is disposed above the microcapsules 270 and close to the light guide plate 100, and the first electrode 240 is disposed on a side of the first substrate 220 away from the microcapsules 270; the second substrate 230 is disposed under the microcapsules 270 and away from the light guide plate 100, and the second electrode 250 is disposed on a side of the second substrate 230 away from the microcapsules 270.

According to at least one embodiment of the present disclosure, the specific types of the first particle 271 and the second particle 272 are not particularly limited. It's only required that one of them is required to be black, the other is white, and they are charged oppositely. For example, in accordance with at least one embodiment of the present disclosure, referring to FIG. 2, the first particles 271 can be black and negatively charged; the second particles 272 can be white and positively charged. Therefore, the reflectance can be adjusted by the first particles 271 and the second particles 272 in the microcapsules 270 to achieve dynamic adjustment of the backlight brightness. According to at least one embodiment of the present disclosure, the specific number of the first particles 271 and the second particles 272 encapsulated by each microcapsule 270 is not particularly limited, and it is only necessary to achieve dynamic adjustment of the backlight brightness by using the microcapsules 270 in the electronic ink.

In order to facilitate understanding, the following is a brief description of the principle that the electronic ink dynamically adjusts the backlight brightness and improves the contrast.

According to at least one embodiment of the present disclosure, referring to FIG. 2, when opposite voltages are applied to the first electrode 240 and the second electrode 250, the negatively charged black first particles 271 and positively charged white second particles 272 are attracted and repelled, respectively. According to at least one embodiment of the present disclosure, when the second electrode 250 is provided with a positive voltage, the negatively charged black first particles 271 are attracted, and the positively charged white second particles 272 are repelled. When the first electrode 240 is provided with a negative voltage, the positively charged white second particles 272 are attracted, and the negatively charged black first particles 271 are repelled. Then, an external light beam is incident on the microcapsules 270 in a direction from the first substrate 220 toward the second substrate 230, the black first particles 271 absorb light, and the white second particles 272 reflect light. The ratio between the black first particles 271 and the white second particles 272 can be adjusted by changing the magnitude of the voltage of the first electrode 240 and the second electrode 250, thereby achieving optimal reflection adjustment and realizing adjustment of brightness. That is, the number of the first particles 271 and the second particles 272 that are attracted and repelled is changed, the amount of the reflected light is further changed, the brightness of the backlight is dynamically adjusted. In this way, the contrast between multiple regions of the backlight module is improved, and the display effect of high dynamic range images is realized.

Figure 3:
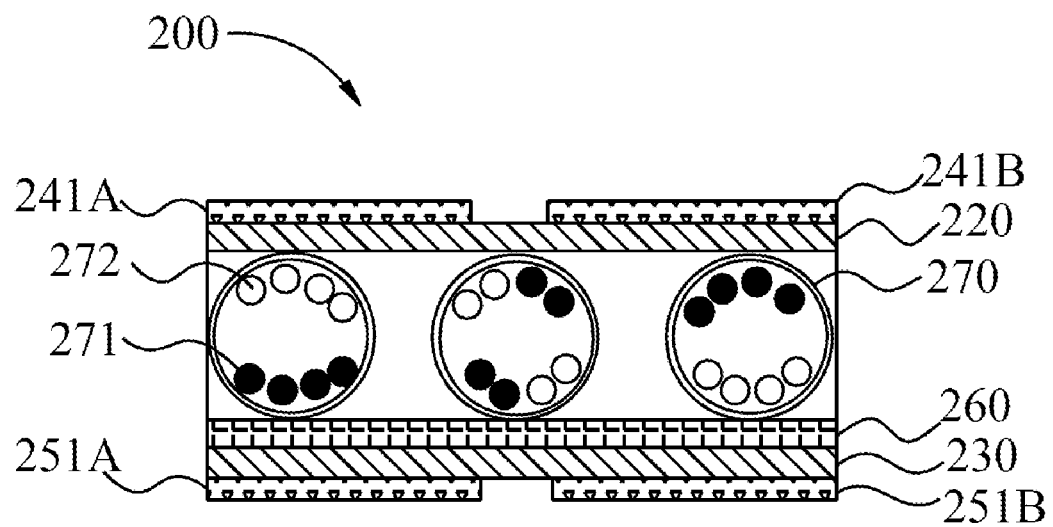
FIG. 3 is a structural schematic diagram of a reflective component according to at least one embodiment of the present disclosure.

In order to further achieve the optimal display effect of the high dynamic range image, according to at least one embodiment of the present disclosure, referring to FIG. 3, each first electrode 240 includes a plurality of first sub-electrodes 241 (indicated with 241A and 241B in FIG. 3), and the corresponding second electrode 250 includes a plurality of second sub-electrodes 251 (indicated with 251A and 251B in FIG. 3); the first sub-electrodes 241 are in one-to-one correspondence with the plurality of second sub-electrodes 251. In this way, the reflection for the backlight by the microcapsules 270 disposed between the first sub-electrode 241 and the second sub-electrode 251 can be adjusted by the correspondingly disposed first sub-electrode 241 and second sub-electrode 251. According to at least one embodiment of the present disclosure, the second sub-electrode 251A may be provided with a positive voltage, the first sub-electrode 241A may be provided with a negative voltage. The negatively charged black first particles 271 may be attracted by the second sub-electrode 251A, and the positively charged white second particles 272 are repelled by the second sub-electrode 251A. The negatively charged black first particles 271 are repelled by the first sub-electrode 241A, and the positively charged white second particles 272 are attracted by the first sub-electrode 241A. Therefore, the reflection for the backlight by the microcapsules 270 can be quickly changed. In some embodiments, another pair of correspondingly disposed first and second sub-electrodes (as indicated with 241B and 251B in the drawing) may be provided with voltages different from 241A and 251A. In this way, the electronic ink provided between the first substrate and the second substrate can have multiple states, thereby realizing the display effect of the high dynamic range image. For example, when a negative voltage is applied to the first sub-electrode 241A, a positive voltage (as shown in FIG. 3) may be applied to the other first sub-electrode 241B; alternatively, a negative voltage different from the voltage value on 241A may be applied. According to the embodiments of the present disclosure, the first particles 271 and the second particles 272 are voltage-controlled without conduction of current, such a control mode has low power consumption, is more convenient and efficient for controlling. This control mode does not require complicated driving circuits and driving chips, thereby improving design feasibility and versatility. According to at least one embodiment of the present disclosure, with the electronic ink technology, a viewing angle of nearly 180 degrees can be achieved, and light in all directions can be sufficiently reflected, thereby achieving an optimal display effect.

According to at least one embodiment of the present disclosure, referring to FIG. 2 and FIG. 3, the reflective component 200 further includes: a reflective layer 260. In at least one embodiment of the present disclosure, the first substrate 220 is disposed close to the first surface 120 of the light guide plate; the reflective layer 260 is arranged between the first substrate 220 and the second substrate 230, and located on the second substrate 230. In some embodiments, the reflective layer 260 and the at least one second electrode 250 are disposed on a same side of the second substrate 230; alternatively, the reflective layer 260 and the at least one second electrode 250 are respectively disposed on both sides of the second substrate 230. With such an arrangement, the backlight is reflected and reused by the reflective layer 260 without affecting the reflection of the electronic ink on the backlight. Therefore, the provided reflective layer 260 can further increase the reflectance to meet the brightness requirement. According to at least one embodiment of the present disclosure, the reflective layer 260 may be disposed on a side of the second substrate 230 adjacent to the microcapsules 270, and the second electrode 250 is disposed on a side of the second substrate 230 away from the microcapsules 270, that is, the reflective layer 260 and the second electrode 250 are respectively disposed on both sides of the second substrate 230.

According to at least one embodiment of the present disclosure, the second electrode 250 may also be multiplexed as a reflective layer 260. For example, the second electrode 250 formed using a reflective metal may be multiplexed as the reflective layer 260. In this way, the second electrode 250 also functions as a reflective layer. According to the embodiment of the present disclosure, the material of the reflective layer 260 is not particularly limited, and it is only necessary to increase the light reflectance to meet the brightness requirement. For example, at least one of bright mirror silver and a conventional white reflective coating can be used.

According to at least one embodiment of the present disclosure, a material of the first electrode 240 is a transparent conductive material. In this way, the reflection of the backlight by the electronic ink is not affected. According to at least one embodiment of the present disclosure, a material of the second electrode 250 includes at least one of graphite, a metal, and a transparent conductive material. Since the electrode disposed away from the light guide plate does not affect the reflection for the backlight, it is not necessary to consider the light transmittance of the material of this electrode. Therefore, the electrode disposed away from the light guide plate 100 can be formed of a metal material having a low light transmittance, so that the production cost can be further reduced.

According to at least one embodiment of the present disclosure, the materials of the first substrate 220 and the second substrate 230 are not particularly limited, and those skilled in the art can select the materials according to actual needs. For example, according to at least one embodiment of the present disclosure, a material of at least one of the first substrate 220 and the second substrate 230 includes at least one of polyethylene terephthalate, glass, polyimide, and polymethyl methacrylate. In this way, the thickness of the reflective component 200 can be reduced, thereby making the display device lighter and thinner. According to at least one embodiment of the present disclosure, PET (polyethylene terephthalate) may be selected as the material of the first substrate 220 and/or the second substrate 230.

Figure 4:
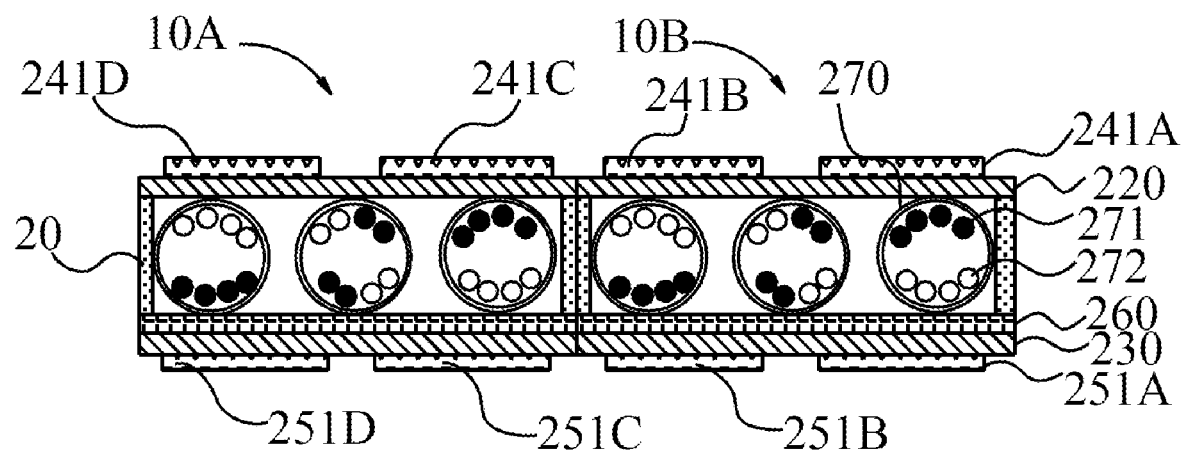
FIG. 4 is a structural schematic diagram of a reflective component according to at least one embodiment of the present disclosure.
Figure 5:
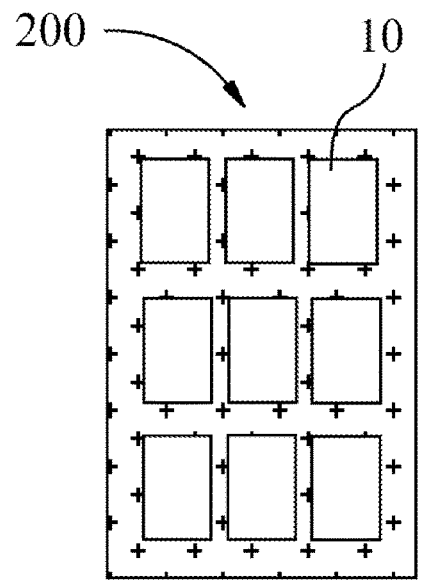
FIG. 5 is a structural schematic diagram of a reflective component according to at least one embodiment of the present disclosure.
Figure 6:
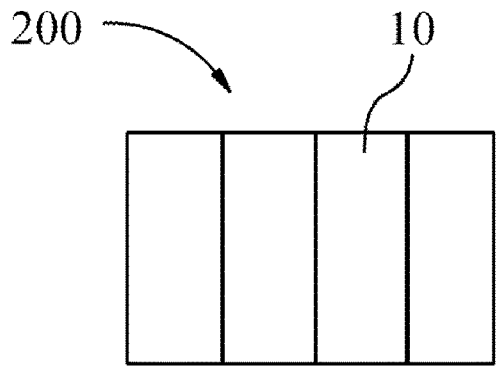
FIG. 6 is a structural schematic diagram of a reflective component according to at least one embodiment of the present disclosure.

According to at least one embodiment of the present disclosure, with reference to FIG. 4 to FIG. 6, in order to further improve the HDR display effect of the display device including the backlight module, the backlight module may be partitioned. According to at least one embodiment of the present disclosure, the first substrate is provided with a plurality of first electrodes, and the second substrate is provided with a plurality of second electrodes. Therefore, the reflective component 200 can be divided into a plurality of display partitions 10, and each of the plurality of display partitions 10 is provided with a first electrode 240 (not shown) and a second electrode 250 (not shown). These partitions can independently adjust the electric field applied to the microcapsules 270 through the first electrode 240 and the second electrode 250, so that the reflection for the backlight by the microcapsules 270 at different partitions can be different. Therefore, when the HDR display is performed, the entire screen has a sufficiently large contrast, so that the bright portion of the displayed image can have appropriate brightness and be kept clear, and the portion in the dark can also retain all the details, realizing high-definition display for the bright and dark partitions. For example, in accordance with at least one embodiment of the present disclosure, referring to FIG. 4, in the reflective component 200, a plurality of display partitions 10 (10A and 10B as shown in the drawing) are included on the first substrate 220 or the second substrate 230. In the display partitions 10, the voltages applied on the first electrode and the second electrode can be different. As a result, the display partitions may have different reflectivities for backlight. In at least one embodiment of the present disclosure, in order to better distinguish the plurality of display partitions 10, the reflective component 200 may further include a retaining wall 20.

In at least one embodiment of the present disclosure, the reflective component further includes at least one retaining wall 20 disposed between the first substrate 220 and the second substrate 230 for separating the electronic ink (i.e., dividing the electronic ink into a plurality of display partitions). In this way, the plurality of display partitions can be utilized to further realize the display effect of the high dynamic range image.

According to at least one embodiment of the present disclosure, in a display partition, a first electrode 240 may include a plurality of first sub-electrodes 241, a second electrode 250 may include a plurality of second sub-electrodes 251, and the first sub-electrodes 241 are one-to-one corresponding to the second sub-electrodes 251. Therefore, the display effect of the high dynamic range image can be achieved. Specifically, in the display partition 10A, the first sub-electrode 241A corresponds to the second sub-electrode 251A, and the first sub-electrode 241B corresponds to the second sub-electrode 251B; in the display partition 10B, the first sub-electrode 241A corresponds to the second sub-electrode 251A, and the first sub-electrode 241B corresponds to the second sub-electrode 251B. In the same display partition (e.g., 10A as shown in the drawing), different voltages (different polarities or different voltage values) can be applied to the first sub-electrodes (e.g., 241C and 241D as shown in the drawing). Therefore, it is possible to more accurately control the reflection for the backlight by the electronic ink in the same display partition.

According to at least one embodiment of the present disclosure, opposite voltages are applied to the first sub-electrode 241 and the second sub-electrode 251 that are disposed correspondingly. For example, a positive voltage is applied to the first sub-electrode 241A, and a negative voltage is applied to the second sub-electrode 251A. According to at least one embodiment of the present disclosure, the voltage applied between the first sub-electrodes 241 of the same display partition is not particularly limited.

For example, the first sub-electrode 241A and the first sub-electrode 241B may be provided with the same voltage or different voltages. Therefore, the backlight brightness of each display partition can be separately controlled.

According to at least one embodiment of the present disclosure, the number of the display partitions 10 in the reflective component 200 is not particularly limited, and those skilled in the art can select it according to actual needs. According to at least one embodiment of the present disclosure, referring to FIG. 5, in the reflective component 200, a plurality of display partitions 10 are included on the first substrate 220 or the second substrate 230. The plurality of display partitions 10 are distributed in a central area of the first substrate 220 or the second substrate 230, and are arranged in an array. In this way, the main display area of the screen can be arrayed and partitioned, thereby meeting most of the HDR display requirements. Alternatively, in accordance with at least one embodiment of the present disclosure, referring to FIG. 6, in the reflective component 200, a plurality of elongated display partitions 10 may be included. Therefore, the entire display area of the display screen using the backlight module can be partitioned.

Figure 7:
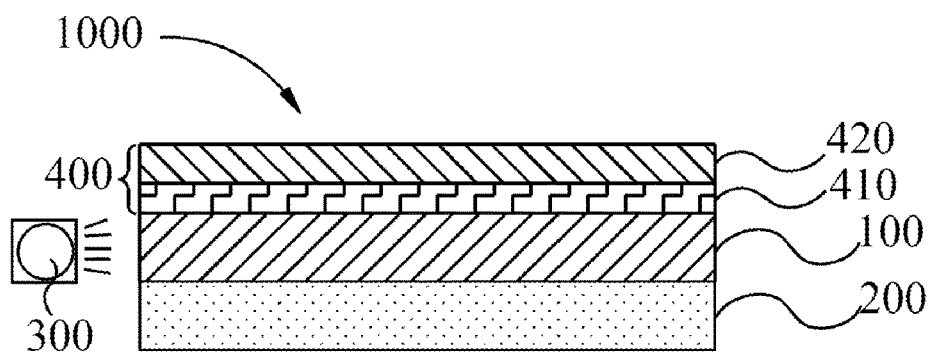
FIG. 7 is a structural schematic diagram of a backlight module according to at least one embodiment of the present disclosure.

According to at least one embodiment of the present disclosure, referring to FIG. 7, the backlight module 1000 further includes a light source 300 and a brightness enhancement component 400. According to at least one embodiment of the present disclosure, the light source 300 is arranged to provide light to the light guide plate 100, and the brightness enhancement component 400 is disposed on a side of the light guide plate 100 away from the reflective component 200. According to the embodiments of the present disclosure, the type of the light source 300 is not particularly limited, and those skilled in the art can select it according to actual needs. In at least one embodiment of the present disclosure, the light source 300 may be a lateral-type light source or a direct light source. The position of the lateral-type light source or the direct light source is not particularly limited, and those skilled in the art can set the position according to the relative position between the conventional lateral-type/direct light source and the light guide plate. The backlight module can be applied to various types of display devices.

According to at least one embodiment of the present disclosure, the brightness enhancement component 400 further includes a diffusion film 410 and a brightness enhancement film 420. The diffusion film 410 is disposed on a side of the light guide plate 100 away from the reflective component 200, and the brightness enhancement film 420 is disposed on a side of the diffusion film 410 away from the light guide plate 100. In this way, the display effect of the high dynamic range image can be further achieved. According to at least one embodiment of the present disclosure, the brightness enhancement disposed 400 may further include: a prism film. According to at least one embodiment of the present disclosure, the prism film can improve the angular distribution of light. The light emitted from the diffusion film 410 and uniformly diverged at various angles can be concentrated to an axial angle, i.e., a front view angle. The axial brightness is thus increased without increasing the total luminous flux.

The backlight module according to the embodiments of the present disclosure has a simple structure and a small thickness, and does not involve preparing an array of LEDs or additionally adding a liquid crystal cell to dynamically adjust the backlight brightness. The contrast between multiple regions of the backlight module is improved, and the display effect of the high dynamic range image is realized.

In addition, the backlight module is low in cost, simple in preparation, and suitable for various types of display devices. According to the embodiments of the present disclosure, only the reflective structure at the bottom of the conventional backlight module needs to be modified, without changing other structures of the display device. The conventional backlight module can be utilized and improved easily, which is advantageous for reducing the cost of production. Further, the dynamic brightness adjustment of the display partition can be realized easily, thereby realizing the display effect of the high dynamic range image.

In another aspect of the present disclosure, a display device is provided. According to at least one embodiment of the present disclosure, the display device includes the backlight module described in any one of the above-mentioned embodiments. Therefore, the display device has all the features and advantages of the backlight module described above, and details are not described herein again. In general, the display device has high contrast for realizing the display effect of the high dynamic range image, and the display device is also low in cost and thinner in thickness.

In yet another aspect of the present disclosure, a method for adjusting a brightness of a backlight module is provided. According to at least one embodiment of the present disclosure, the backlight module includes: a light guide plate including a light emitting surface and a first surface opposite to the light emitting surface; and a reflective component on a side of the light guide plate away from the light emitting surface; the reflective component having a reflectivity adjustable to adjust the brightness of the backlight module. The backlight module has all the features and advantages of the backlight module described above, and details are not described herein again. The method includes: adjusting the reflectivity of the reflective component to adjust the brightness of the backlight module. In this way, the method can easily utilize the reflective component in the backlight module, dynamically adjust the brightness of the backlight, and improve the contrast between multiple regions of the backlight module, thereby realizing the display effect of the high dynamic range image.

According to at least one embodiment of the present disclosure, the reflective component includes: a first substrate and a second substrate opposite to each other, and electronic ink between the first substrate and the second substrate; the first substrate is closer to the light guide plate than the second substrate; the first substrate is provided with at least one first electrode, and the second substrate is provided with at least one second electrode; the at least one first electrode is in one-to-one correspondence with the at least one second electrode. The step of adjusting the reflectivity of the reflective component to adjust the brightness of the backlight module includes: applying opposite voltages to the first electrode and the corresponding second electrode respectively, thereby adjusting the reflectivity of the backlight module using the electronic ink. According to the embodiments of the present disclosure, the specific features, materials, or characteristics of the first substrate, the second substrate, the first electrode, and the second electrode have been previously described in detail and are not described herein again. According to at least one embodiment of the present disclosure, the electronic ink has all of the features and advantages of the electronic ink described above, and will not be described herein.

According to at least one embodiment of the present disclosure, the method further includes: separately controlling an electric field between each first electrode and a corresponding second electrode. Specifically, the step of separately controlling an electric field between each first electrode and a corresponding second electrode includes: separately controlling an electric field direction and/or electric field strength between each first electrode and the corresponding second electrode.

In general, the method can easily utilize the reflective component in the backlight module, dynamically adjust the brightness of the backlight, and improve the contrast between multiple regions of the backlight module, thereby realizing the display effect of the high dynamic range image.

In the description of the present disclosure, the orientation or positional relationship of the terms "upper", "lower" and the like is based on the orientation or positional relationship shown in the drawings, and is merely for the convenience of describing the present disclosure and does not require that the disclosure must be constructed and operated in a specific orientation, therefore, it should not be construed as limiting the disclosure.

In the description of the present specification, the description of the terms "at least one embodiment", "at least one embodiment" or the like means that the specific features, structures, materials or characteristics described in connection with the embodiments are included in at least one embodiment of the present disclosure. In the present specification, the schematic representation of the above terms is not necessarily directed to the same embodiment or example. Furthermore, the particular features, structures, materials, or characteristics may be combined in a suitable manner in any one or more embodiments or examples. In addition, combinations of different embodiments or examples described in the specification and features of the various embodiments or examples may be combined by those skilled in the art without contradicting each other. Further, it should be noted that in the present specification, the terms "first" and "second" are used for descriptive purposes only, and are not to be construed as indicating or implying a relative importance or implicitly indicating the number of the technical features indicated.

While the embodiments of the present disclosure have been shown and described above, it is understood that the above-described embodiments are illustrative and are not to be construed as limiting the scope of the disclosure. Variations, modifications, alterations and variations of the above-described embodiments may be made by those skilled in the art within the scope of the present disclosure.

What is claimed is:

1. A backlight module, comprising:
   a light guide plate comprising a light emitting surface and a first surface opposite to the light emitting surface; and
   a reflective component on the light guide plate away from the light emitting surface,
   wherein the reflective component comprises a reflectivity that is configurable to adjust a brightness of the backlight module, and
   wherein the reflective component comprises electronic ink comprising a plurality of microcapsules,
   wherein each microcapsule of the plurality of microcapsules is encapsulated with first particles and second particles,
   wherein the first particles and the second particles are oppositely charged, and
   wherein the first particles are black and the second particles are white.

2. The backlight module according to claim 1, wherein the reflective component comprises:
   a first substrate and a second substrate opposite to each other, and
   electronic ink between the first substrate and the second substrate,
   wherein the first substrate is closer to the light guide plate than the second substrate,
   wherein the first substrate is provided with at least one first electrode, and the second substrate is provided with at least one second electrode, and
   wherein the at least one first electrode is in one-to-one correspondence with the at least one second electrode.

3. The backlight module according to claim 2, wherein the reflective component further comprises:
   a reflective layer between the first substrate and the second substrate,
   wherein the reflective layer is on the second substrate.

4. The backlight module according to claim 3, wherein the reflective layer and the at least one second electrode are on a same side of the second substrate, or the reflective layer and the at least one second electrode are respectively on both sides of the second substrate.

5. The backlight module according to claim 2,
   wherein a material of the first electrode comprises a transparent conductive material, and
   wherein a material of the second electrode comprises at least one of graphite, a metal, or a transparent conductive material.

6. The backlight module according to claim 2, wherein a material of at least one of the first substrate or the second substrate comprises at least one of polyethylene terephthalate, glass, polyimide, or polymethyl methacrylate.

7. The backlight module according to claim 2, wherein an orthographic projection of the at least one first electrode on the first substrate and an orthographic projection of a corresponding second electrode on the second substrate are substantially overlapping.

8. The backlight module according to claim 7,
   wherein each first electrode comprises a plurality of first sub-electrodes, and the corresponding second electrode comprises a plurality of second sub-electrodes,
   wherein the first sub-electrodes are in one-to-one correspondence with the plurality of second sub-electrodes.

9. The backlight module according to claim 7, wherein the reflective component further comprises:
   at least one retaining wall between the first substrate and the second substrate separating the electronic ink.

10. The backlight module according to claim 2,
    wherein the reflective component is divided into a plurality of display partitions,
    wherein each of the plurality of display partitions has a corresponding first electrode and second electrode.

11. A display device comprising the backlight module according to claim 1.

12. A method for adjusting a brightness of a backlight module, wherein the backlight module comprises:
    a light guide plate comprising a light emitting surface and a first surface opposite to the light emitting surface; and
    a reflective component on the light guide plate away from the light emitting surface, wherein the reflective component comprises a reflectivity that is configurable to adjust the brightness of the backlight module,
    wherein the reflective component comprises electronic ink comprising a plurality of microcapsules,
    wherein each microcapsule of the plurality of microcapsules is encapsulated with first particles and second particles,
    wherein the first particles and the second particles are oppositely charged, wherein the first particles are black and the second particles are white, and wherein the method comprises:

adjusting the reflectivity of the reflective component to adjust the brightness of the backlight module.

13. The method according to claim 12, wherein the reflective component comprises:

a first substrate and a second substrate opposite to each other, and electronic ink between the first substrate and the second substrate, wherein the first substrate is closer to the light guide plate than the second substrate, wherein the first substrate is provided with at least one first electrode, and the second substrate is provided with at least one second electrode, and wherein the at least one first electrode is in one-to-one correspondence with the at least one second electrode, wherein the adjusting the reflectivity of the reflective component to adjust the brightness of the backlight module comprises applying opposite voltages to the first electrode and the corresponding second electrode respectively, thereby adjusting the reflectivity of the backlight module using the electronic ink.

14. The method according to claim 13, wherein the method further comprises:

separately controlling an electric field between each first electrode and a corresponding second electrode.

15. The method according to claim 14, wherein the separately controlling an electric field between each first electrode and a corresponding second electrode comprises:

separately controlling an electric field direction or electric field strength between each first electrode and the corresponding second electrode.

16. The backlight module according to claim 1, wherein the reflective component comprises a first substrate and a second substrate opposite to each other, and electronic ink between the first substrate and the second substrate, wherein the first substrate is closer to the light guide plate than the second substrate, wherein the first substrate is provided with at least one first electrode, and the second substrate is provided with at least one second electrode, wherein the at least one first electrode is in one-to-one correspondence with the at least one second electrode, and wherein the second electrode is multiplexed as a reflective layer.

17. The display device according to claim 11, wherein the reflective component comprises a first substrate and a second substrate opposite to each other, and electronic ink between the first substrate and the second substrate, wherein the first substrate is closer to the light guide plate than the second substrate, wherein the first substrate is provided with at least one first electrode, and the second substrate is provided with at least one second electrode, wherein the at least one first electrode is in one-to-one correspondence with the at least one second electrode.

18. The display device according to claim 17, wherein the reflective component further comprises a reflective layer between the first substrate and the second substrate, and wherein the reflective layer is on the second substrate.

* * * * *